UNITED STATES PATENT OFFICE.

FREDERICK O. KILGORE, OF SOMERVILLE, MASSACHUSETTS.

SELF-STARTING APPARATUS.

1,300,217.   Specification of Letters Patent.   Patented Apr. 8, 1919.

Application filed March 6, 1914. Serial No. 822,999.

*To all whom it may concern:*

Be it known that I, FREDERICK O. KILGORE, a citizen of the United States, residing in Somerville, in the county of Middlesex and State of Massachusetts, have invented an Improvement in Self-Starting Apparatus, of which the following description, in connection with the accompanying drawings, is a specification, like characters on the drawings representing like parts.

This invention relates to an apparatus, which is especially adapted among other uses, to be employed as a self starter for the engine or motor of automobiles and the like.

The invention has for its object to provide a simple, inexpensive and efficient apparatus, which can be readily applied to automobiles now in use, and which has provision for enabling the apparatus to be used as a driving member for the internal combustion engine of the automobile or other vehicle, and which also has provision for enabling the engine or motor to drive the apparatus. To this end I employ a clutch member which is capable of being attached to or connected with the shaft of the engine or motor, and a second clutch member which coöperates with the first mentioned clutch member and is geared to a rotatable shaft, so that rotation of the latter effects rotation of the engine shaft through the gearing and clutch members referred to. Provision is also made for coupling the rotatable shaft directly to the engine shaft, so that the latter can drive the former when desired.

Provision is made for rotating the rotatable shaft by one or more fluid operated motors. These and other features of this invention will be pointed out in the claim at the end of this specification.

Figure 1:
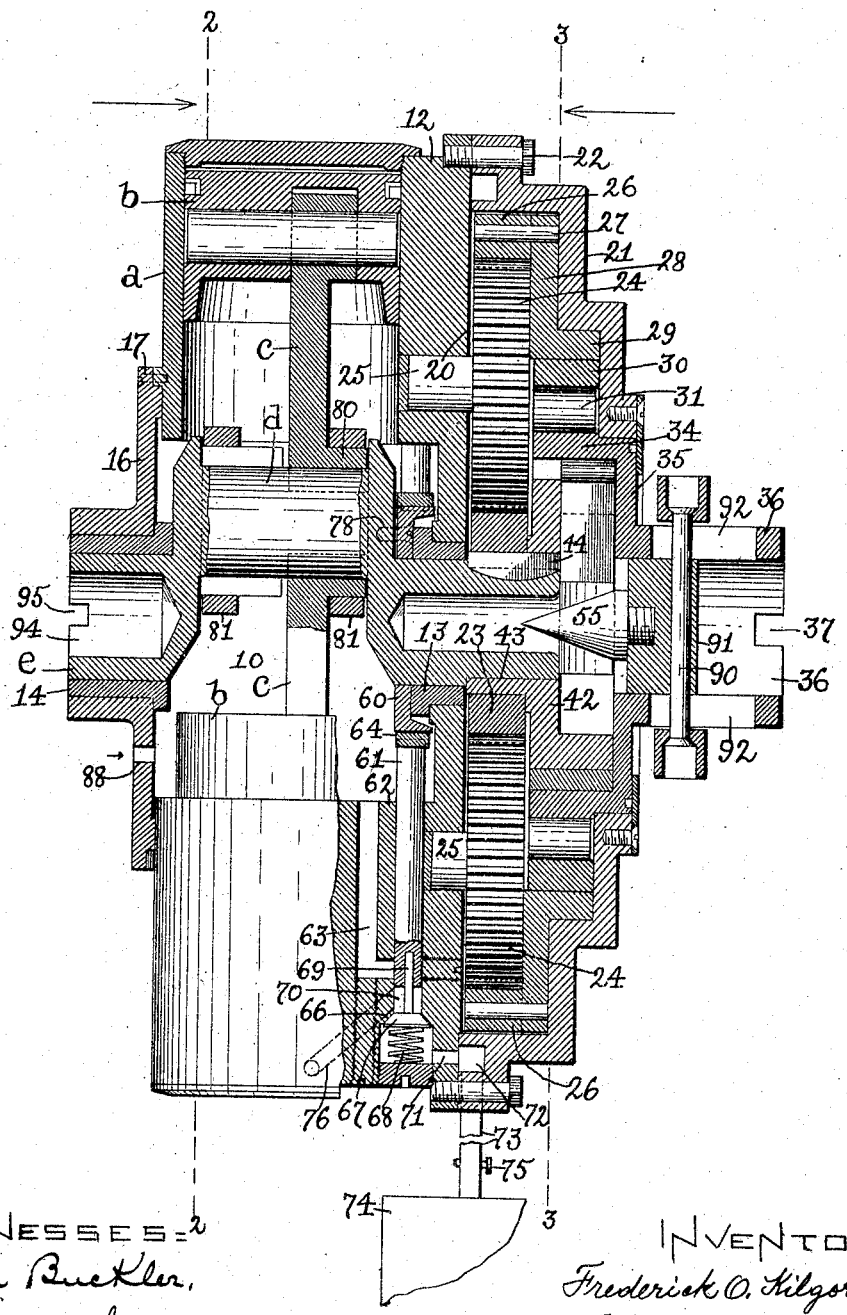

Figure 1 is a vertical section and elevation of one form of apparatus embodying this invention.

Figure 2:
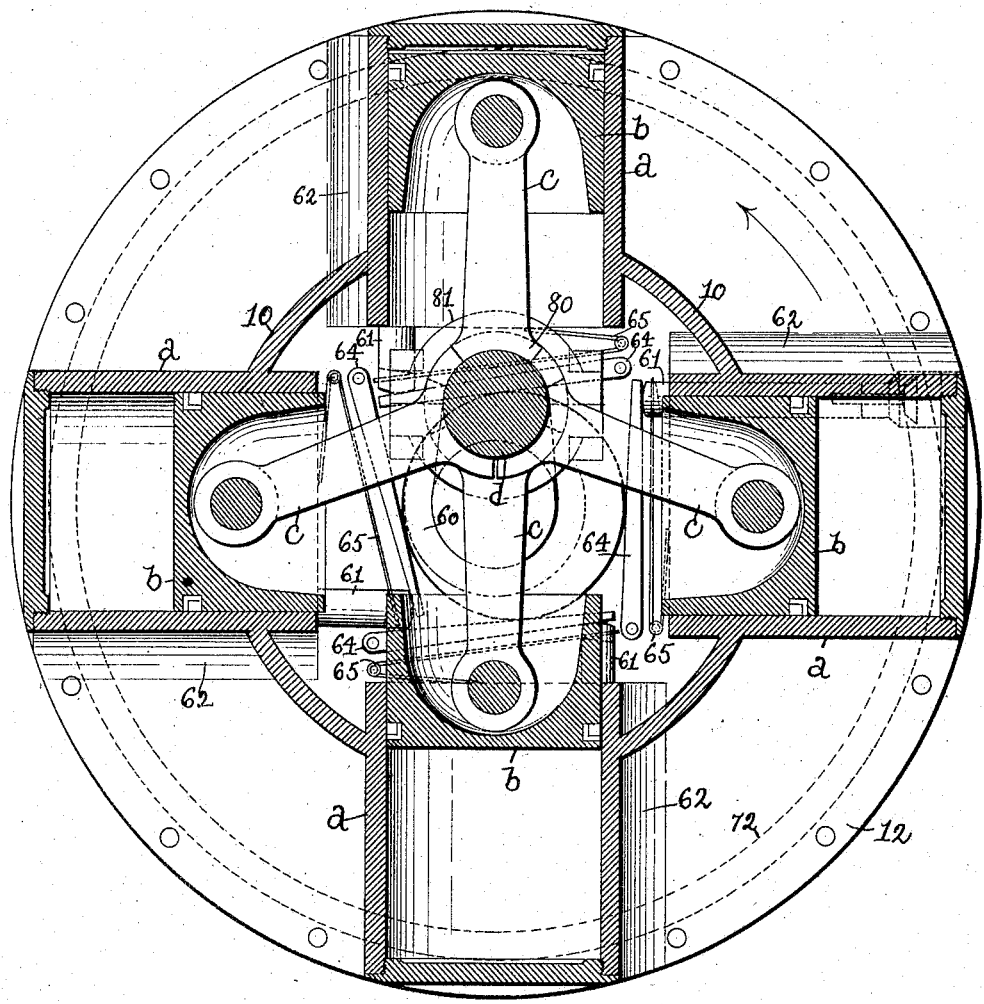

Fig. 2, a section on the line 2—2, Fig. 1, and

Figure 3:
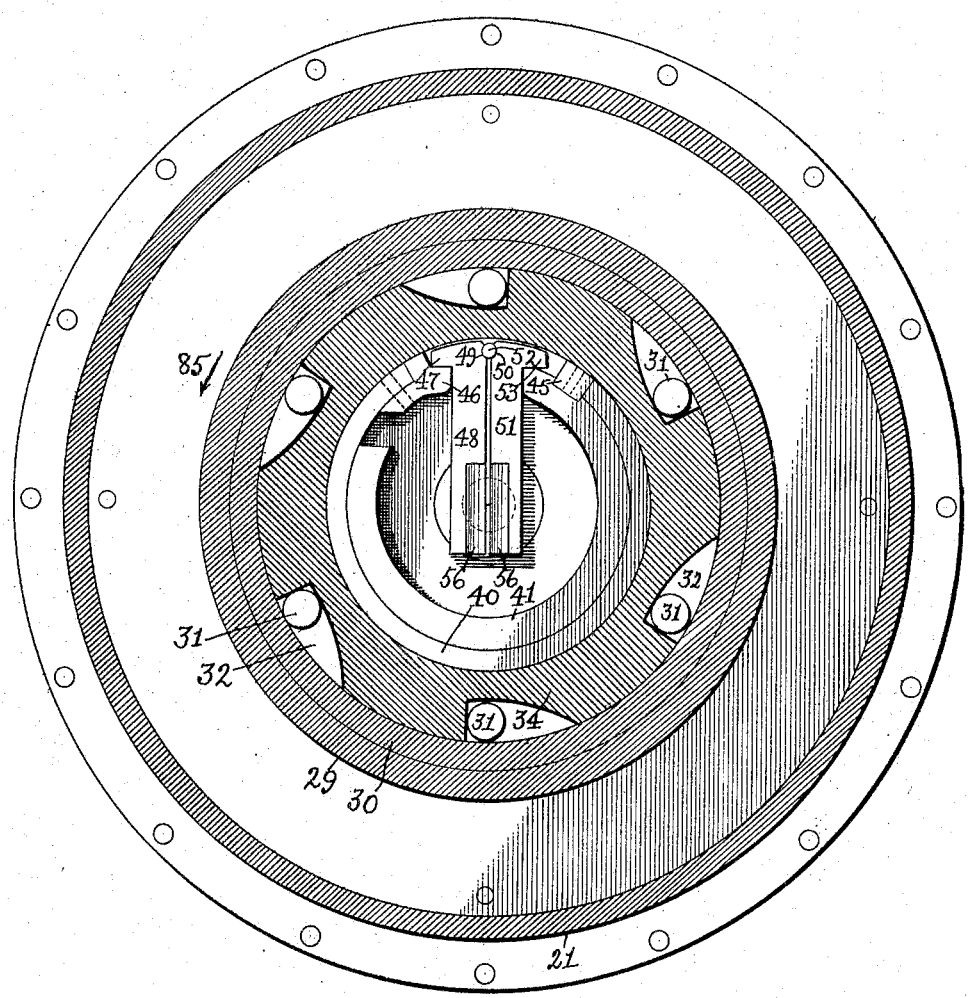

Fig. 3, a section on the line 3—3, Fig. 1.

In the present instance, I have shown the invention as embodied in an apparatus provided with four air pumps, each comprising a cylinder $a$, a piston $b$ therein, and piston rod $c$ joining the piston $b$ with the crank pin $d$ on a crank shaft $e$. The four air pumps are arranged substantially on the quarter and are of like construction, so that a detailed description of one will suffice for all. Each cylinder $a$ is cast integral with a cylindrical hub 10 extended axially from a back plate or disk 12, and forming a crank case in which the crank of the shaft $e$ revolves. The crank shaft $e$ is journaled in bearings 13, 14, supported respectively by the back plate 12 and by a cover or cap 16 on the end of the crank case or cylindrical hub 10, to which latter said cover is detachably secured by screws 17 or otherwise.

The crank shaft $e$ is extended through the back plate 12 and into a chamber 20 formed by a flanged plate or disk 21, which is secured to the back plate fluid-tight by screws 22 or otherwise. The crank shaft $e$ within the chamber 20 has fast on it a pinion 23, which meshes with preferably two gears 24 mounted on stud shafts 25, carried by the back plate 12 and located on opposite sides of the crank shaft $e$. The gears 24 mesh with an internally toothed ring or gear 26, which has attached to it as by pins 27 or otherwise, a clutch member comprising a disk 28 having a hub or annular flange 29 in which is fitted tight a bearing ring 30 preferably hardened steel, which coöperates with steel rollers 31 located in substantially V-shaped notches or recesses 32, see Fig. 3, in the periphery of an annular flange 34 on a disk 35 extended from a hub 36, which may form part of the crank shaft of the internal combustion engine or motor, not shown, but of any desired or known construction, or as is preferred, the hub 36 may be made separate from the engine shaft and provided with notches 37 or otherwise, for engagement with the engine shaft in a manner similar to that in which the ordinary hand operated crank is now engaged with the engine shaft.

The ring 34 provided with the recesses 32 constitutes a clutch member, which is connected with the shaft of the engine or motor, and by means of the rollers 31 is coupled to the clutch member 30, 29, which is connected by gearing with the crank shaft of the air pump, so that, when the crank shaft of the pump is rotated by air pressure, as will be described, the shaft of the engine is driven through the gearing and clutch from the crank shaft of the pump, and the engine or motor of the automobile is started.

Provision is also made for coupling the crank shaft e of the air pump directly to the shaft of the engine or motor, when it is desired to have the engine or motor drive the air pump as will be described.

To this end, the clutch member 34, 35, which is connected with the engine or motor, has located within it an expansible and contractible ring 40, which is external to a segmental flange 41 on a disk 42, fast on a hub 43, which latter is secured on the crank shaft e of the pump and has the pinion 23 secured to it by a key 44 or otherwise. The expansible ring 40 has one end abutting against a projection 45 on the flange 41, and its other end has secured to it a nose piece 46, which extends under an arm 47 on a lever 48, having a substantially semi-circular groove 49, which coöperates with a like groove 50 on a lever 51 for the reception of a pin 52, the lever 51 being provided with an arm 53, which extends over one end of the flange 41.

The levers 48, 51 are thus suspended from the flange 41 and the ring 40, and are capable of having their lower ends separated by a cone 55, which coöperates with inclined walls 56 on the levers, said walls forming a V-shaped opening, see Fig. 3, into which the apex of the cone 55 enters. The cone 55 serves to spread the lower ends of the levers apart, and thereby causes the lever 48 to move the free end of the expansible ring 40, and cause it to expand and frictionally engage the clutch member 34, and thereby couple the latter to the flange 41, which latter is attached to the crank shaft e of the pump, and as a result the shaft e is directly connected with the engine shaft and is driven at the speed of the engine shaft. It will thus be seen that in the present instance, the clutch member 34, which is connected with the shaft of the engine, coöperates with two separate clutch members, one of which to wit, the member 30, 29, is indirectly connected with the crank shaft of the air pump, and the other of which, to wit, the member 40, is directly connected with the crank shaft of the air pump through the flange 41.

Provision is made for controlling the admission of air under pressure from a suitable source of supply into the cylinders of the air pumps, when the latter are used for starting the rotation of the engine shaft, and also for replenishing the pressure supply by the air pumps.

In the present instance, I have represented one arrangement of apparatus for this purpose.

To this end, the crank shaft e of the air pumps has fast on it an eccentric disk 60, which operates a valve for each air pump. The valve referred to is shown as a cylindrical rod 61, see Fig. 1, which is movable in a bore in the web 62 attached to each cylinder a, and is arranged to cover and uncover the end of a passage 63, which communicates with the crank case 10. The valve 61 has its outer end engaged by a lever 64, see Fig. 2, which in turn engages the periphery of the eccentric 60, so that, in the rotation of the eccentric, the latter acts on the lever 64 to move the valve so as to close the inner end of the passage 63, and then to permit a spring 65 to move the valve outward and open the inner end of the said passage. The bore in the casting or web 62 in which the valve 61 moves, is enlarged at its outer end to form a valve seat 66 for a check valve 67, which is seated by a spring 68 and is opened by the valve 61, which latter abuts against a stem or rod 69 on the check valve 66. In the present instance, the valve rod 69 is extended into a socket or hole in the end of the valve 61, and said socket is made of sufficiently shallow depth, to insure the bottom of the socket engaging the stem or rod 69, after the valve 61 has been moved into position to close the inner end of the passage 63 and before the high part of the eccentric 60 engages the lever 64, so that, when the high part of the eccentric engages the lever, the valve will be moved sufficiently far to force the check valve 67 off of its seat and open the check valve, and thereby establish communication between a chamber 70 between the two valves 61, 67 with a port 71 in the back plate 12, which port communicates with the annular groove or chamber 72 in the rim of the plate 21, which groove is connected by a pipe 73 with a tank or vessel 74, which constitutes the supply tank for the fluid under pressure and is shown in Fig. 1 on a small scale. The pipe 73 is provided with a suitable valve 75 controlling the passage of air into and out of the supply tank, and designed in practice to be actuated by the operator of the automobile or other vehicle.

The chamber 70 is connected by a passage 76 indicated by dotted lines in Fig. 1, with the outer end of the pump cylinder a. The eccentric disk 60 may be fastened to the crank shaft by screws 78 or in any other suitable manner.

The piston rods c of the pumps may be secured to the crank pin d in any suitable manner, and in the present instance each piston rod is provided on its inner end with a circular flange 80 over which it fitted a ring 81, which couples opposing piston rods to the crank pin.

The eccentric 60 is so shaped, that no matter where the crank shaft e of the pump stops, one at least of the valves 61 is in contact with the stem or rod 69 of one of the check valves, and the latter is opened to connect the chamber 70 with the supply tank, and through the passage 76 with the cylinder a. As a result, when the operator desires to start the engine, he opens the valve 75 and allows air or other fluid under pressure, say of 80 lbs., to enter one of the air cylinders a, and this air pressure acting against the piston in said cylinder starts the crank shaft in rotation, and each pump in succession is connected with the supply tank and receives fluid pressure therefrom.

The crank shaft e of the air pumps is thus rotated in the direction contra to the movement of the hands of a watch, and through the pinion 23 and gears 24 rotates the internal gear 26 in the direction of the hands of a watch, thereby rotating the clutch member 29, 30 in this direction. The clutch member 29, 30 in its rotation in the direction indicated by the arrow 85 in Fig. 3, which is shown as contrawise of the clock because of the section, on which Fig. 3 is taken, moves the steel rollers 31 from the wide part of the recesses 32 toward the apexes or narrow ends of said recesses, and causes the said rollers to couple the clutch member 29, 30 with the clutch member 34, and thereby couple the engine shaft with the crank shaft indirectly through the gearing referred to. The engine or motor is thus started in operation, and when running properly, the operator closes the valve 75 and the air pumps cease to operate, and the crank shaft e and the clutch member 30, 29 come to rest, as the clutch member 34, which rotates with the engine shaft advances sufficiently to bring the wide parts of the recesses 32 toward the rollers 31 and thereby unclutches the member 30, 29 from the rotating member 34, which allows the former and the crank shaft of the air pumps to come to rest. If the operator desires to replenish the air pressure in the supply tank 74, he moves the cone 55 forward into engagement with the inclined surfaces 56 of the levers and separates the lower ends of the same, and causes the ring or clutch member 40 to be expanded into frictional engagement with the clutch member 34, thereby directly coupling the engine shaft with the crank shaft of the air pumps, so that the crank shaft is driven at the same speed as the engine shaft. As a result, the air pumps quickly restore the air pressure in the supply tank.

When the air pumps are driven from the engine shaft, the piston of each cylinder sucks in atmospheric air into the crank case through a port 88, see Fig. 1, and from the crank case through the passage 63, chamber 70 and passage 76 into the cylinder a, on one stroke, and on the return stroke discharges it through the passage 76 into the chamber 70 and from the latter through the port 71, annular groove 72 and pipe 73 into the tank 74, the valve 61 being at such time closed and the check valve 67 being open.

The cone 55 may be moved by the operator, through a suitable lever, not shown, but which engages the socketed ends of a bar or rod 90, which is passed through a block 91 and through slots 92 in the hub 36 of the clutch member connected with the engine shaft. The block 91 slides in the hub 36. The starter herein shown can be applied to automobiles now in use and provided with the usual hand operated crank, and it is only necessary to replace the hand operated crank with the starter and attach the latter to the vehicle, so that the hub 36 engages the engine shaft.

The shaft e is provided at its front end with a socket 94, which is designed to receive the hand crank and is provided with suitable notches 95 to be engaged by suitable lugs on said hand crank as now commonly used. If it should become necessary to crank the engine by hand, this can be easily done with very little effort, as the gearing 23, 24, 26, multiplies the power applied to the hand crank, so as to easily start the engine. Furthermore, danger of accident from a back fire to the operator, is avoided, as in case the engine shaft is reversed by a back fire, the shock is absorbed by the gearing and the air pumps. In practice the chamber 20 containing the gearing and clutch members, is designed to contain oil or other lubricant, and the expansible ring or clutch member 40 can be gradually engaged with a slipping friction with the clutch member 34, which enables the air pump to be connected with the engine shaft at any speed of the latter, without danger of breaking or disarranging any part of the apparatus. The frictional engagement of the clutch members 34, 30 through the rollers 31 is more positive.

In the present instance, the invention is shown in an apparatus having a plurality of fluid pumps which are set quartering, which insures the engine or motor being started, if the latter should stop on the dead center.

In the present instance, I have shown one construction embodying the invention, in which fluid pressure is employed to rotate the shaft e and thereby start rotation of the engine shaft, and while it may be preferred to rotate the shaft e by fluid pressure it is not desired to limit the invention in this respect, as the shaft e may be driven by an electric motor or it may be the armature shaft of an electric motor, and used with or without the air pumps, or it may be otherwise driven.

Claim:

In an apparatus of the character described, in combination, a fluid-operated motor provided with a casing having a cylinder attached thereto, a piston reciprocating in said cylinder, a crank shaft supported by said casing and to which said piston is connected, a valve in said casing controlling the passage of air into said cylinder, a device mounted on said crank shaft to rotate therewith and operate said valve, a shaft to be driven by said crank shaft, mechanism for indirectly connecting said crank shaft with said driven shaft, and means for directly connecting said crank shaft with the shaft to be driven, and means for connecting the shaft to be driven directly or indirectly at the will of the operator.

In testimony whereof I have signed my name to this specification in the presence of two subscribing witnesses.

FREDERICK O. KILGORE.

Witnesses:
JAS. H. CHURCHILL,
J. MURPHY.

Copies of this patent may be obtained for five cents each, by addressing the "Commissioner of Patents, Washington, D. C."